May 18, 1965  A. K. ALLEN  3,183,792
FREE PISTON OSCILLATOR
Filed Jan. 10, 1963  2 Sheets-Sheet 2
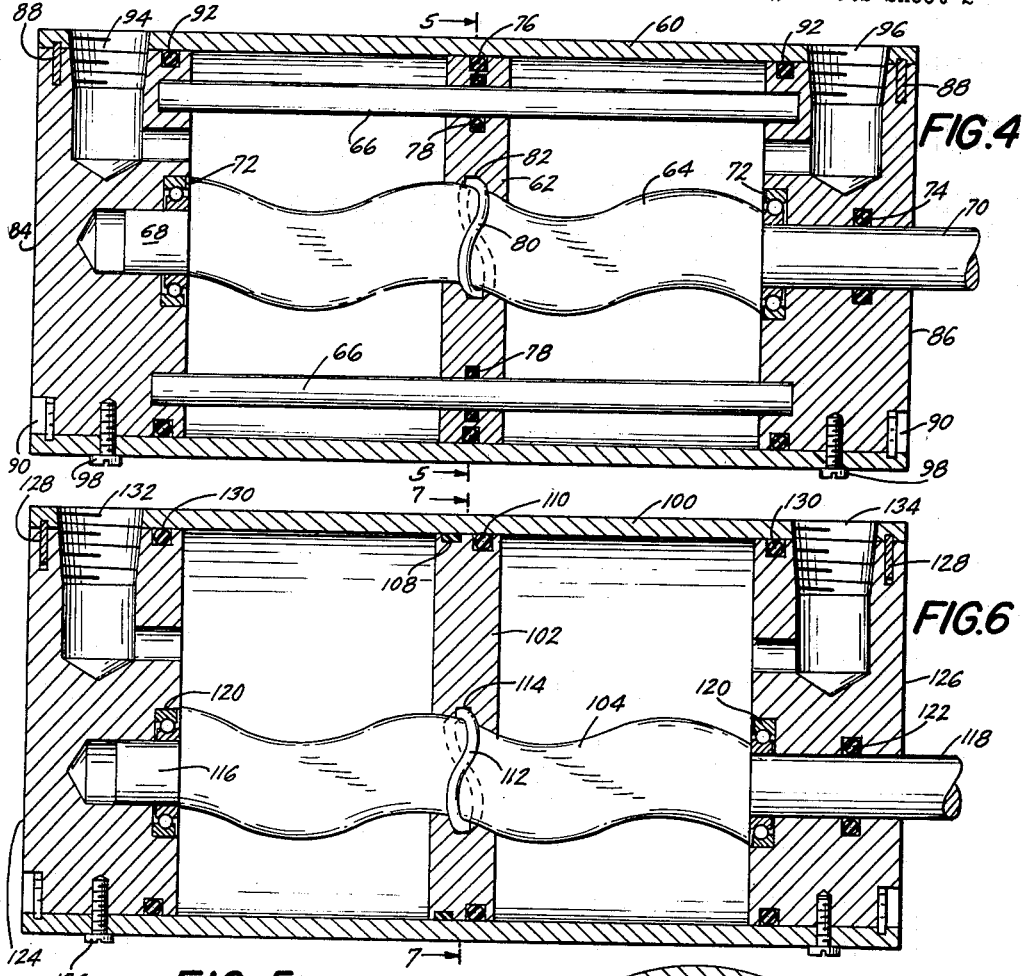
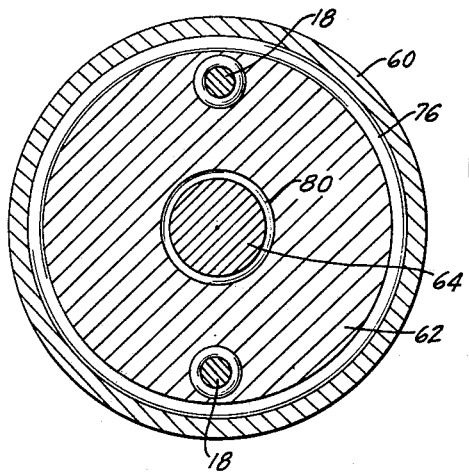
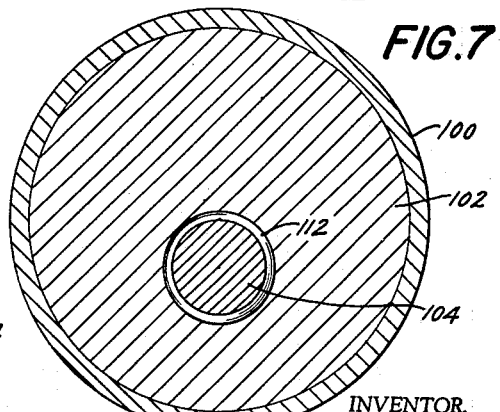
INVENTOR.
ALTON K. ALLEN
BY James and Franklin
ATTORNEYS United States Patent Office 3,183,792
Patented May 18, 1965

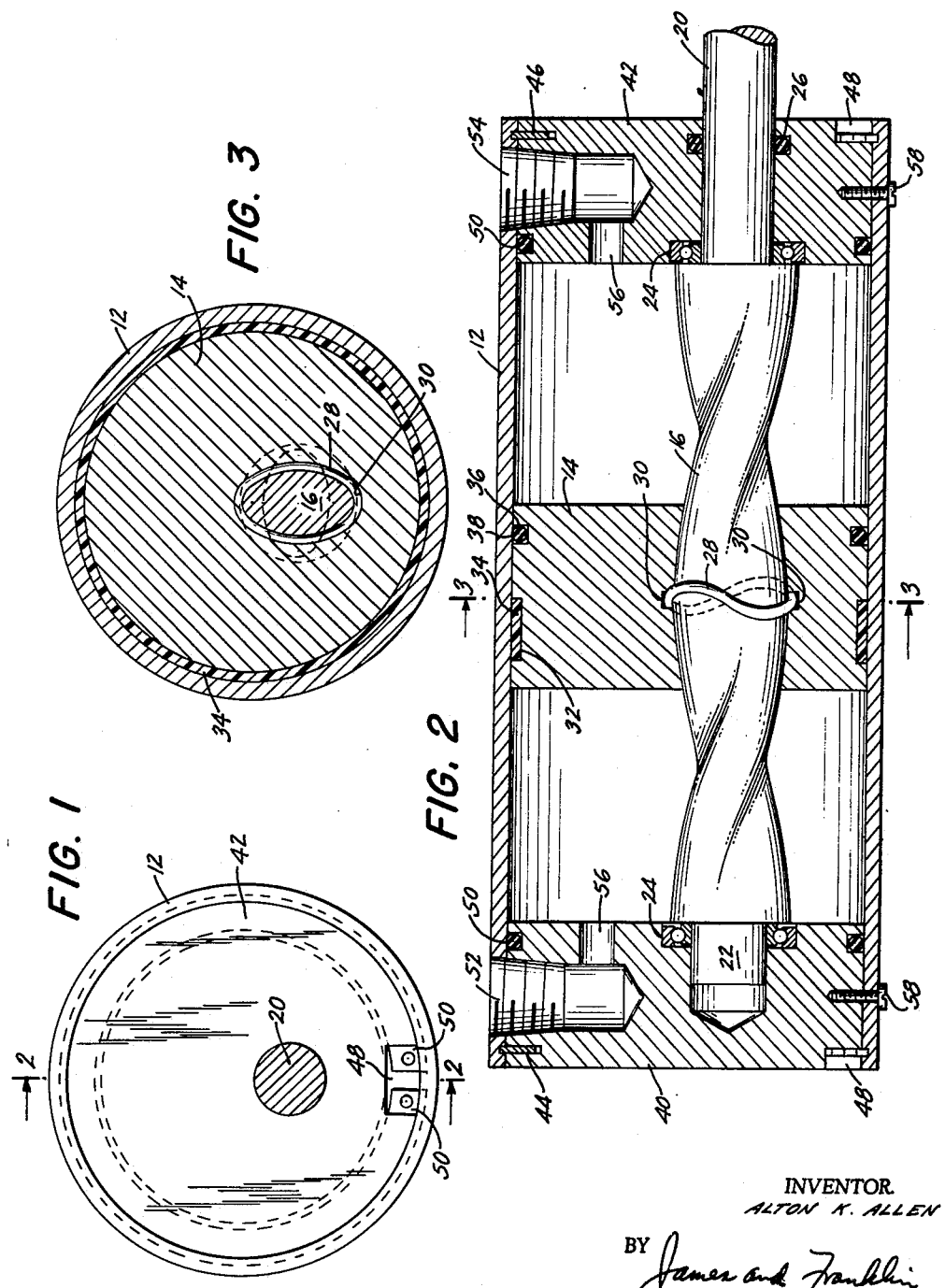

3,183,792
FREE PISTON OSCILLATOR
Alton K. Allen, 11 Flower Lane, Kings Point, N.Y.
Filed Jan. 10, 1963, Ser. No. 250,699
13 Claims. (Cl. 92—33)

This invention relates to fluid-operated motors, and more particularly to free piston oscillators.

Such devices are designed to convert reciprocating straight-line motion, as normally performed by an air cylinder or hydraulic cylinder, into a reciprocating rotary motion. They utilize a cylinder into the ends of which pressure fluid is alternately introduced, forcing the piston to reciprocate. The piston is a free piston, that is, it is not connected to a piston rod.

As heretofore made, the free piston is prevented from rotating by a pair of off-center slide rods inside the cylinder. These rods are parallel to the travel of the piston, and their ends are secured to the ends of cylinder, and they pass through holes in the piston.

On the axis of the cylinder there is a shaft having a non-circular cross section which is twisted. The center of the piston has a hole which conforms to the twisted shaft. The shaft is prevented by its bearings from moving longitudinally, so that as the piston is translated, the shaft rotates.

One fault with this previous device is that the pair of slide rods must be sealed against fluid pressure, and introduce considerable friction. Another disadvantage is that the non-circular center shaft is difficult to seal with a standard O-ring.

The primary object of the present invention is to generally improve such devices, and to overcome the foregoing difficulties. One specific object is to eliminate the need for slide rods. Instead the shaft is offset from the center of the cylinder, and this in cooperation with the wall of the cylinder, prevents rotation of the piston.

Another object of the invention is to improve the seal around the shaft. This is done by making the shaft circular in cross section at every point along its working length, with the centers of successive circular sections describing a helix. A circular section is particularly well adapted to the use of an O-ring for sealing the piston at the shaft. With the usual non-circular twisted shaft the periphery is on a helix, but the centers of successive sections are on a straight axial line. In my improved helical shaft not only the periphery but also the centers of the successive sections are on a helix.

In accordance with a more detailed object of the invention, the O-ring around the shaft is so warped that at every point the ring is perpendicular to the longitudinal elements of the surface of the shaft. In accordance with another feature and object of the invention, the periphery of the piston is grooved and carries a strip of nylon or other bearing material. The piston preferably is additionally grooved and there carries an O-ring to seal against leakage around the piston.

To accomplish the foregoing objects, and such other objects as will hereinafter appear, my invention resides in the free piston oscillator elements, and their relation one to another as are hereinafter more particularly described in the following specification. The specification is accompanied by drawings in which:

FIG. 1 is an end view of a free piston oscillator embodying some features of the present invention;

FIG. 2 is a longitudinal section taken approximately in the plane of the line 2—2 of FIG. 1;

FIG. 3 is a transverse section taken approximately in the plane of the line 3—3 of FIG. 2;

FIG. 4 is a longitudinal section through another free piston oscillator embodying another feature of my invention;

FIG. 5 is a transverse section taken approximately in the plane of the line 5—5 of FIG. 4;

FIG. 6 is a longitudinal section through a free piston oscillator combining both features of my invention; and FIG. 7 is a transverse section taken approximately in the plane of the line 7—7 of FIG. 6.

Referring to the drawing, and more particularly to FIGS. 1, 2 and 3, the oscillator there shown comprises a cylinder 12 carrying a free piston 14 which is reciprocable but not rotatable in the cylinder 12. There is also a shaft 16 extending longitudinally of the cylinder, this shaft being rotatable but not reciprocable. Piston 14 is slidable along the shaft 16 and inside the cylinder 12. The shaft 16 is helical, so that rectilinear reciprocation of the piston 14 is converted to rotary reciprocation of the shaft 16. The shaft is offset from the axis of the cylinder and thereby in cooperation with the cylinder, prevents rotation of the piston 14, without necessitating the use of slide rods.

The ends 20 and 22 of the shaft are cylindrical and have suitable bearings here indicated as ball bearings 24. These bearings are designed to act as thrust bearings as well as radial bearings, for which purpose the outer face of the inner race, and the inner face of the outer race, are somewhat cut away so that thrust will be taken by the balls. The output end 20 of the shaft is additionally provided with sealing means, in this case an O-ring 26. The working part 16 of the shaft (the part between the bearings) is non-circular in section, and twisted. It might, for example, be square or rectangular in section, but it is preferred to use an elliptical section. The shaft is helical in that the periphery describes a helix, but the centers of successive sections lie on the axis of the shaft.

The passage of the shaft through the piston 14 is sealed by means of an O-ring 28. It is therefore desirable to avoid the formation of corners, and in the present case the non-circular section of the shaft is elliptical as shown in FIG. 3. The O-ring is received in a groove 30, which may itself be rectangular in cross section.

However, the groove does not lie in a single plane perpendicular to the axis of the shaft, as is usually the case. Instead the groove 30 supports the O-ring 28 in a warped position so biased that at every point the ring is perpendicular to the longitudinal elements of the surface of the shaft. This insures more successful sealing action and longer wear of the O-ring.

The periphery of the piston 14 is grooved at 32 and carries in said groove a band or ring of material 34 which may be nylon or other material having good lubricating and wear characteristics. The material should be a bearing material, and instead of nylon it may be self-lubricating (oil impregnated) sintered bronze, or it may be some other bearing type of metal. The purpose is to take the reaction of the piston when it attempts to rotate while forcing the shaft to rotate. The offset shaft must work in cooperation with the cylinder wall to prevent rotation of the piston, and the resulting wear is minimized by using the nylon insert.

The periphery of the piston is additionally grooved at 36, and carries an O-ring 38 in the groove 36 in order to seal the motor against leakage around the piston.

The structure of the cylinder may follow any present known or desired practice. The illustrated cylinder is closed by circular ends 40 and 42 which are mechanically locked in position by resilient steel expansion rings 44 and 46. These are received in mating grooves, and at the point 48 the ends 40 and 42 are cut away to expose the tips 50 (FIG. 1) of the locking ring. By using a suitable tool these tips may be drawn together, thereby releasing the cylinder end for removal. The ends may be grooved and fitted with O-rings indicated at 50, to prevent leakage.

The power fluid, typically compressed air, may be connected at 52 and 54, and a suitable valve mechanism is provided to supply compressed fluid to the ends of the cylinder in alternation, it being understood that the pipe connections 52 and 54 lead into the cylinder, as by means of the passages 56. The ends 40 and 42 are locked against rotation, as by means of radial pins or screws 58.

Another form of the invention is illustrated in FIGS. 4 and 5 of the drawing, referring to which the motor again comprises a cylinder 60, a free piston 62 which is reciprocable but not rotatable in the cylinder, and a shaft 64 extending longitudinally of the cylinder, the said shaft being rotatable but not reciprocable, and along which the piston 62 is slidable. In this case rotation of the piston 62 is prevented by means of slide rods 66, the shaft 64 being located on the axis of the cylinder 60. The ends 68 and 70 of the shaft are carried in suitable antifriction bearings 72, and the output end 70 is sealed by means of O-ring 74.

The working portion 64 of the shaft is helical so that rectilinear motion of the piston 62 is converted to rotary reciprocation of the shaft. However, in this case the shaft is circular in cross section at every point along its working length, and the centers of the successive circular sections lie on or define a helix. Of course the longitudinal elements of the surface of the shaft are parallel to the said helix, so that the surface also is helical. This shaft differs from the usual helical shaft (and from that shown in FIG. 2) in that the usual shaft is twisted with the centers of successive sections located on a straight line axis. The shaft 64 of FIG. 4 is somewhat akin to a corkscrew, but with the radius of the helix reduced to a small value, and the diameter of the material increased to a large value.

The periphery of piston 62 is grooved and carries an O-ring 76. The slide rods 18 also are sealed against fluid leakage, as by means of O-rings 78. The passage of the shaft through the piston is sealed by means of an O-ring 80. This is carried in a groove 82 in the piston, and the said groove preferably supports the O-ring in a warped position so biased that at every point the O-ring is perpendicular to the longitudinal elements of the surface of the shaft. This warping of the O-ring is a refinement, intended to improve the wear resistance and sealing action of the O-ring, but it is not essential. In simpler form the groove 82 may be a simple circular groove in a plane perpendicular to the axis of the cylinder.

The ends 84 and 86 of the cylinder may be constructed as previously described, or in any other desired fashion. In the present case they are held by snap rings 88 which have a resilient expansion action, and which are accessible at the cut away parts 90. The ends are sealed by O-rings 92. Pipe connections for fluid supply are indicated at 94 and 96, and it will be understood that the fluid supply is controlled by suitable valve means to cause reciprocation of the piston. Such valve means are known and in common use, and are therefore not illustrated here. The ends are locked against rotation, as by means of radial pins or screws 98.

In its preferred form my improved motor preferably combines both features previously described, and such a motor is shown in FIGS. 6 and 7 of the drawing. FIG. 1 would also serve as an end view, but with different numerals. Referring to FIGS. 6 and 7, I again employ a cylinder 100 with a free piston 102 which is reciprocable but not rotatable in the cylinder. There is also a shaft 104 which extends longitudinally of the cylinder, and which is rotatable but not reciprocable, and along which the piston 102 is slidable.

In the present case the shaft is offset from the center of the cylinder, thereby eliminating the need for the slide rods shown at 66 in FIG. 4. In this respect it resembles the motor shown in FIG. 2, but in FIG. 6 the shaft is circular rather than noncircular in cross section. It is circular at every point along its working length, and the centers of successive circular sections define a helix. Thus the shaft is like that described in connection with FIG. 4, but it is offset from the center of the cylinder.

Because of the dual function of the shaft, the periphery of the piston 102 is preferably grooved and carries a ring 108 of a self-lubricating and wear resistant material such as nylon or other bearing material. It is also grooved to receive an O-ring 110 which seals the piston against leakage.

The passage of the shaft through the piston is sealed by means of an O-ring 112 received in a groove 114. Here again the groove and O-ring may lie in a plane perpendicular to the axis of the cylinder, for simplified manufacture, but in preferred form the groove supports the O-ring in a warped position so biased that at every point the O-ring is perpendicular to the longitudinal elements of the surface of the shaft.

As previously described, the ends 116 and 118 of the shaft may be carried in antifriction bearings 120, and the output end 118 may be sealed by means of an O-ring 122. The cylinder ends 124 and 126 may be locked in position by means of resilient expansion rings 128, and may be sealed against leakage by means of O-rings 130. Fluid to operate the piston is supplied at pipe connections 132 and 134, and the fluid supplied, usually air, is controlled by conventional valve means to cause reciprocation of the piston and consequent rotary reciprocation of the shaft. The ends are locked against rotation, as by means of radial pins or screws 136.

In all cases the ends of the cylinder should be locked against rotation. With slide rods, as in FIG. 4, the torque is applied to the ends of the cylinder by the slide rods, and with an offset shaft, as in FIG. 2 or FIG. 6, the torque is applied to the ends of the cylinder through the shaft and its bearings.

In all cases the passage through the piston conforms to the shaft. When dealing with a helical shaft of circular cross section, as in FIGS. 4 and 6, the passage through the piston may be arbitrarily located at a low point, or side point, or high point, as desired. If located at a low point, it draws a previously high portion of the shaft down to a low position as the piston moves along. Conversely, if the piston passage is at a high point, it draws a previously low portion of the shaft to a high position as the piston moves along.

The desired motors may be made in any desired size, and for a variety of purposes.

It is believed that the construction and operation of my improved motor, as well as the advantages thereof, will be apparent from the foregoing detailed description. It will also be apparent that while I have shown and described the improvement in several preferred forms, changes may be made without departing from the scope of the invention, as sought to be defined in the following claims. In the claims the reference to the helical shaft being circular in cross section is not intended to exclude a cross section which is substantially circular, rather than perfectly circular.

I claim:

1. A free piston oscillator comprising a cylinder, a free piston which is reciprocable but not rotatable in said cylinder, and a shaft extending longitudinally of the cylinder, which shaft is rotatable but not reciprocable, and along which the piston is slidable, said shaft being helical so that rectilinear reciprocation of the piston is converted to rotary reciprocation of the shaft, said helical shaft being circular in cross section at every point along its working length, and the centers of successive circular sections lying on a helix.

2. A free piston oscillator comprising a cylinder, a free piston which is reciprocable but not rotatable in said cylinder, and a shaft extending longitudinally of the cylinder, which shaft is rotatable but not reciprocable, and along which the piston is slidable, said shaft being helical so that rectilinear reciprocation of the piston is converted to rotary reciprocation of the shaft, said shaft being offset from the axis of the cylinder and thereby in cooperation with the cylinder preventing rotation of the piston, said helical shaft being circular in cross section at every point along its working length, and the centers of successive circular sections lying on a helix.

3. A free piston oscillator as defined in claim 1, in which the opening through the piston for the helical shaft is sealed by means of an O-ring located in a groove in the piston around the shaft.

4. A free piston oscillator as defined in claim 2, in which the opening through the piston for the helical shaft is sealed by means of an O-ring located in a groove in the piston around the shaft.

5. A free piston oscillator as defined in claim 1, in which the opening through the piston for the helical shaft is sealed by means of an O-ring located in a groove in the piston around the shaft, said groove supporting said O-ring in a warped position so biased that at every point the O-ring is perpendicular to the longitudinal elements of the surface of the shaft.

6. A free piston oscillator as defined in claim 2, in which the opening through the piston for the helical shaft is sealed by means of an O-ring located in a groove in the piston around the shaft, said groove supporting said O-ring in a warped position so biased that at every point the O-ring is perpendicular to the longitudinal elements of the surface of the shaft.

7. A free piston oscillator as defined in claim 1, in which the periphery of the piston is grooved and carries in said groove a band of bearing material.

8. A free piston oscillator as defined in claim 2, in which the periphery of the piston is grooved and carries in said groove a band of bearing material.

9. A free piston oscillator as defined in claim 1, in which the periphery of the piston is grooved and carries in said groove a band of bearing material, and in which the periphery of the piston is additionally grooved and carries an O-ring in the latter groove to seal against leakage around the piston.

10. A free piston oscillator as defined in claim 2, in which the periphery of the piston is grooved and carries in said groove a band of bearing material, and in which the periphery of the piston is additionally grooved and carries an O-ring in the latter groove to seal against leakage around the piston.

11. A free piston oscillator as defined in claim 1, in which the opening through the piston for the helical shaft is sealed by means of an O-ring located in a groove in the piston around the shaft, and in which the periphery of the piston is grooved and carries in said groove a band of a bearing material, and in which the periphery of the piston is additionally grooved and carries an O-ring in the latter groove to seal against leakage around the piston.

12. A free piston oscillator as defined in claim 2, in which the opening through the piston for the helical shaft is sealed by means of an O-ring located in a groove in the piston around the shaft, and in which the periphery of the piston is grooved and carries in said groove a band of a bearing material, and in which the periphery of the piston is additionally grooved and carries an O-ring in the latter groove to seal against leakage around the piston.

13. A free piston oscillator comprising a cylinder, a free piston which is reciprocable but not rotatable in said cylinder, and a shaft extending longitudinally of the cylinder, which shaft is rotatable but not reciprocable, and along which the piston is slidable, said shaft being helical so that rectilinear reciprocation of the piston is converted to rotary reciprocation of the shaft, and said shaft being offset from the axis of the cylinder and thereby in cooperation with the cylinder preventing rotation of the piston, the opening through the piston for the helical shaft being sealed by means of an O-ring located in a groove in the piston around the shaft, said groove supporting said O-ring in a warped position so biased that at every point the O-ring is perpendicular to the longitudinal elements of the surface of the shaft.

References Cited by the Examiner

UNITED STATES PATENTS

| | | | |
|---|---|---|---|
| 1,243,554 | 10/17 | Rasmussen | 92—33 |
| 2,974,646 | 3/61 | Miller et al. | 92—33 |
| 2,982,590 | 5/61 | Gunning. | |
| 3,011,845 | 12/61 | Watt et al. | 92—168 |

RICHARD B. WILKINSON, *Primary Examiner*.